Feb. 17, 1953     A. H. ROSS     2,628,542
ADJUSTABLE CONVEYER FOR CARTONING MACHINES
Filed Sept. 17, 1945     13 Sheets-Sheet 1

INVENTOR.
Alexander H. Ross
BY
Wood, Arey, Herron & Evans
Attorneys.

Feb. 17, 1953          A. H. ROSS          2,628,542
ADJUSTABLE CONVEYER FOR CARTONING MACHINES

Filed Sept. 17, 1945          13 Sheets-Sheet 2

INVENTOR.
Alexander H. Ross
BY
Wood, Arey, Herron & Evans
Attorneys.

Feb. 17, 1953  A. H. ROSS  2,628,542
ADJUSTABLE CONVEYER FOR CARTONING MACHINES
Filed Sept. 17, 1945  13 Sheets-Sheet 3

INVENTOR.
Alexander H. Ross
BY Wood, Arey, Herron & Evans
Attorneys.

Feb. 17, 1953          A. H. ROSS          2,628,542
ADJUSTABLE CONVEYER FOR CARTONING MACHINES
Filed Sept. 17, 1945          13 Sheets—Sheet 4

INVENTOR.
Alexander H. Ross
BY
Wood, Arey, Herron & Evans
Attorneys

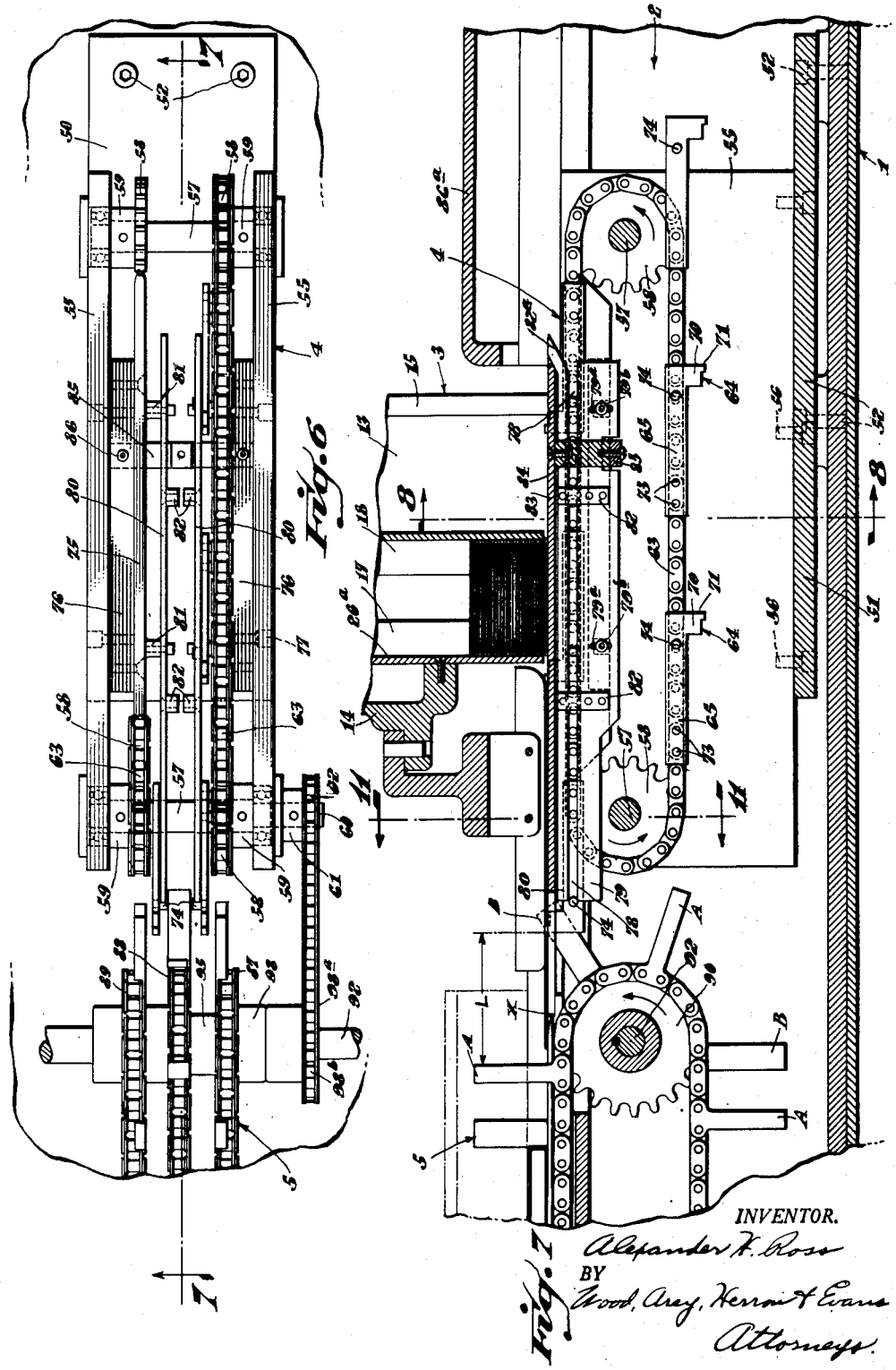

Feb. 17, 1953 A. H. ROSS 2,628,542
ADJUSTABLE CONVEYER FOR CARTONING MACHINES
Filed Sept. 17, 1945 13 Sheets-Sheet 6

INVENTOR.
Alexander H. Ross
BY Wood, Arey, Herron & Evans
Attorneys.

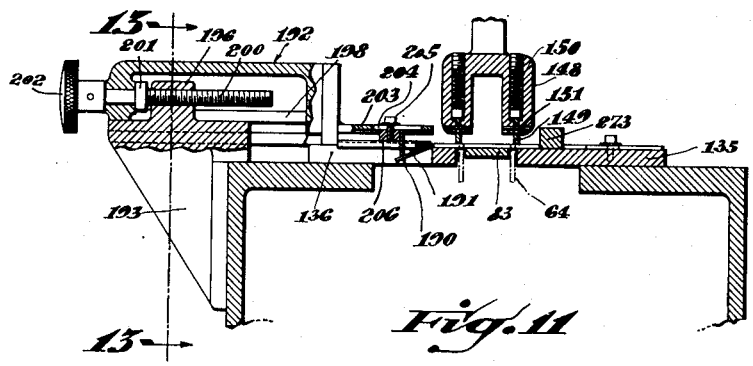

INVENTOR.
Alexander H. Ross
BY Wood, Arey, Herron & Evans
Attorneys

Feb. 17, 1953     A. H. ROSS     2,628,542
ADJUSTABLE CONVEYER FOR CARTONING MACHINES
Filed Sept. 17, 1945     13 Sheets-Sheet 10

INVENTOR.
Alexander H. Ross
BY Wood, Arey, Herron & Evans
Attorneys.

Feb. 17, 1953          A. H. ROSS          2,628,542
ADJUSTABLE CONVEYER FOR CARTONING MACHINES
Filed Sept. 17, 1945          13 Sheets-Sheet 12
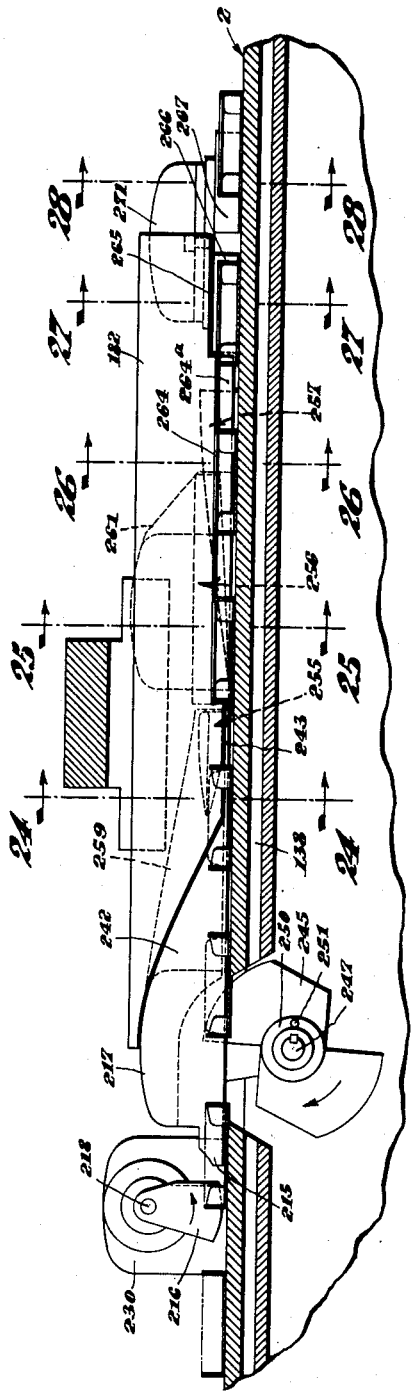
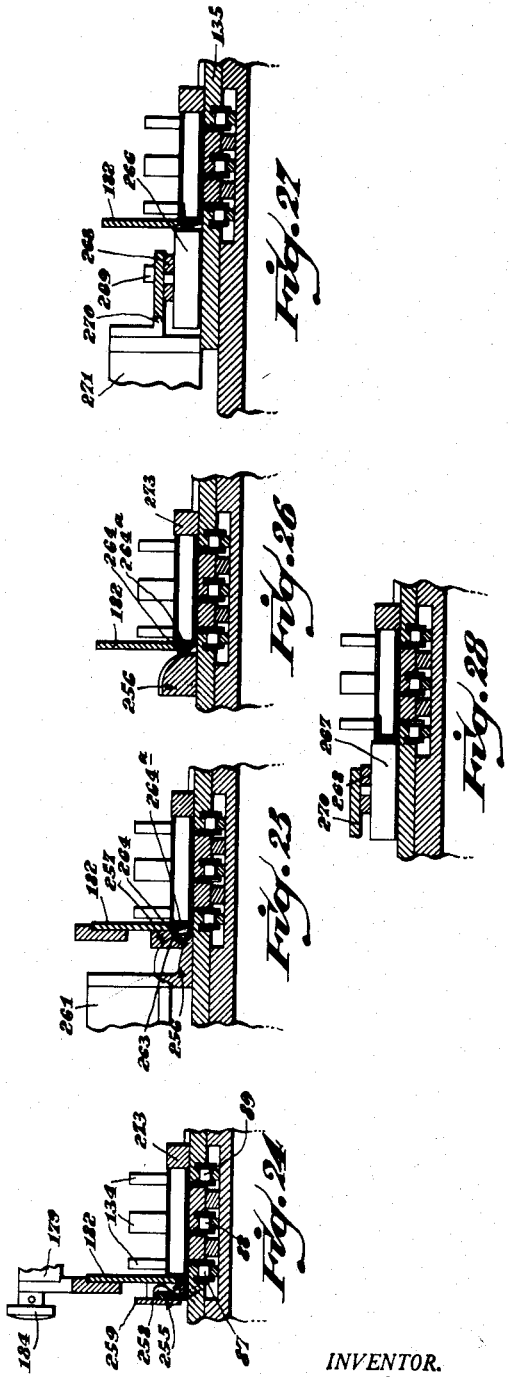
INVENTOR.
Alexander H. Ross
BY
Wood, Arey, Herron & Evans
Attorneys.

Patented Feb. 17, 1953

2,628,542

UNITED STATES PATENT OFFICE 2,628,542

ADJUSTABLE CONVEYER FOR CARTONING MACHINES

Alexander H. Ross, Lakeside Park, Ky., assignor, by mesne assignments, to Emhart Manufacturing Company, a corporation of Delaware Application September 17, 1945, Serial No. 616,723

4 Claims. (Cl. 93—49)

This invention relates to an improved packaging machine which is adapted to erect a carton from a flat folded blank, and prepare it for the reception of merchandise.

The principal objective of this invention has been to provide a cartoning machine devoid of cumbersome mechanisms and free of reciprocating parts, and one which is capable of being operated, without jamming, at higher production speeds than cartoners presently available.

A further objective of the invention has been to provide an adjustable cartoning machine capable of being set conveniently through dial or knob controls to accommodate a variety of cartons of different sizes and shapes. More specifically, in this respect, the invention contemplates a machine which may be converted easily and quickly, without the use of tools, for handling cartons of one size or shape following a run in which cartons of a different size and shape were erected.

In more detail, the invention is directed to improvements in the carton magazine which is arranged to hold a stack of flat-folded cartons to be erected, improvements in the feeding or delivery of these carton blanks from the magazine one after another, improvements in the apparatus by which the cartons are "squared" or erected from their flat condition to their opened or set-up condition, and improved apparatus for manipulating the flaps and end closures of the cartons whereby the use of reciprocating knives, blades, or other elements for inserting the end flaps is eliminated. The invention also is directed to an apparatus in which these improvements are provided through elements of the machine which are readily adjustable so as to operate upon packages of a variety of types and shapes.

In the past, cartoning machines, both fully and semi-automatic in their purpose, have been available, but all have been characterized by the presence of extensive cams, links and reciprocating members, interoperated necessarily through a multiplicity of joints and connections. On the whole, the machines obviously were cumbersome and skilled operators were required, not only to adjust the machines, but to keep them in proper operating condition. Moreover, because of the substantial mass and inertia of the moving parts, and because of the reciprocating or oscillating movement of many of these parts, the speed of operation of the past machines has been limited.

In accordance with the present invention, unidirectional or simple rotary movements are employed. The flat cartons drop one after another from the magazine to a continuously advancing feeder, and, from here, they are delivered to an advancing transport at which the blanks are "squared," the side flaps folded, the end flap closures conditioned for insertion and inserted to complete the set-up operation. The operations in some instances are conducted on the blanks serially, and in other instances simultaneously. For instance the transport has the double function of not only conveying the cartons as they are operated upon but also of cooperating in the erection of the flat blanks whereby simplification of the mechanism is accomplished.

The invention, in its preferred form, also contemplates a departure from past practice in operating upon carton blanks while the end flaps or closures thereof are at the bottoms of the blanks rather than at the top (or overhanging) as heretofore. This enables many of the operations to be conducted while the end flaps and adjoining carton walls are supported upon a smooth table, whereas the past machines required provisions for holding the end flaps in an elevated position, against their tendency to drop, until they were ready to enter a carton previously prepared by the conventional knife inserter.

From the method point of view the invention contemplates erection of a flat-folded carton blank, with its flap lowermost, by squeezing upon opposite longitudinal edges of the carton during its advancement. The squeezing or pressure at the opposite longitudinal edges, or at local points thereon, causes a hinging action to take place at the longitudinal folds or seams of the blank, thereby displacing one carton face from the other and thereby opening up the box. According to this preferred method the top face of the carton is lifted from the lower face, which carries the end flap, while the lower face is supported.

From the machine point of view a preferred form of the invention for employing this method includes a transport having a plurality of fingers extending therefrom for engaging the opposite longitudinal edges of the carton, and means for causing fingers at one side of the carton relatively to approach the fingers at the other side whereby they cooperate to squeeze the carton and thereby erect it, and also thereafter to sustain the carton in its open or erected form.

In more detail, the machine includes a magazine having corner elements delineating a chute or hopper for reception of a stack of carton blanks. The width spacing and the length spacing of these corner angle elements are adjustable by rotation of graduated dials conveniently accessible upon the magazine housing.

From the magazine, the cartons are advanced by one or more feed fingers constituting part of a continuous conveyor moving always in one direction appropriately to deliver the cartons from the magazine to a transport. The transport, in turn, embodies a plurality of continuous conveyors presenting one or more fingers for engaging the forward edge of a delivered carton blank, and one or more fingers for engaging the rearward or trailing edge of the same carton blank. By cooperation of these fingers during their advancement the carton edges are relatively squeezed toward one another, and thereby the blank is opened into box form. Successively, the side flaps are folded and the end flap is brought up and tucked in. For these operations, plows or former elements are arranged one after another, adjacent the transport and at one side thereof, to engage the respective side end and flaps. These elements individually are adjustable by micrometer dials or with respect to scales for setting the adjustments. The fingers of the transport also are adjustable to accommodate cartons of different width and effect erection thereof, and their shape may conform to the shape of the erected box, if desirable, as when the package is of polygonal or unconventional design in cross section. All of the elements of the transport and feeder are movable in unison in normal machine operation; therefore the feeder need not be retimed, as heretofore required, whenever the machine is being set for operation on a different size of package. The variation in the spacing of the transport fingers is provided through a conveniently accessible adjustment member which is preferably in the form of a worm for effecting a relative movement between the fingers of the transport respectively leading and trailing the box which is located therebetween. During manipulation the boxes are supported by and held upon a table by a pressure shoe which also is adjustable to accommodate boxes extending upwardly above the table to different heights. Conversion of the machine from operation on one type of carton to a carton of another type is provided entirely through the rotation of knobs or elements, all within easy range and access of the operator, and all located adjacent the scenes of operation which are controlled thereby.

From the foregoing principles upon which the invention is predicated and from the following detailed description of the drawings, in which a preferred embodiment of the machine is illustrated, those skilled in the art readily will comprehend various modifications to which the invention is susceptible.

In the drawings:

Figure 6 is a top plan view of the feeder mechanism with the magazine and cover plate removed to expose the parts.

Figure 7 is a longitudinal sectional view through the feed mechanism taken on the line 7—7 of Figure 6. In this view the lower portion of the magazine and the feeder cover plate are shown in mounted position.

Figures 9, 10:
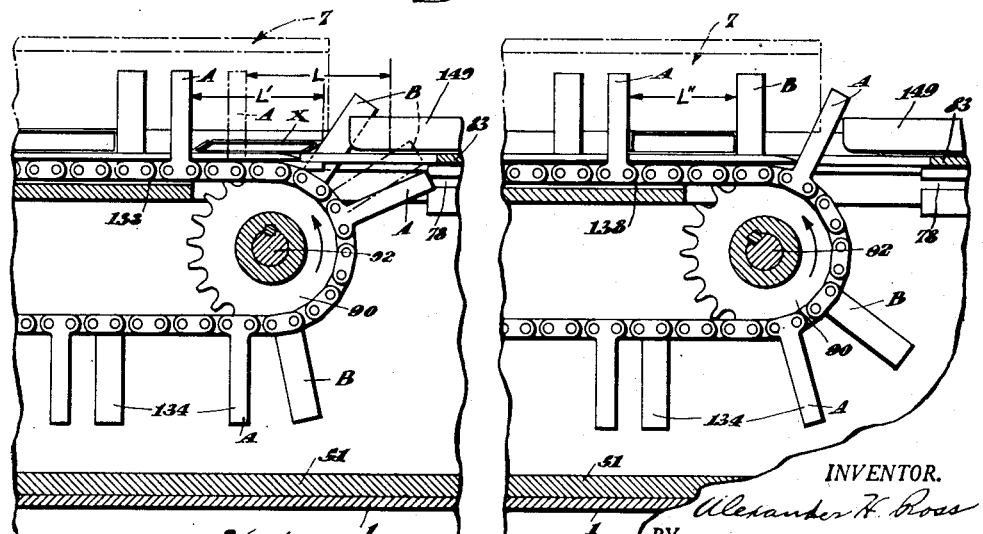

Figures 9 and 10 are fragmentary views, similar to Figure 7, showing the receiving end of the carton transport; Figure 7 shows the transport receiving a carton in collapsed position; Figure 9 shows the position of the parts when the carton is partially squared; and Figure 10 shows the position of the parts in the fully squared form.

Figure 11 is a sectional view taken on the line 11—11 of Figure 7 and illustrates a first operation on the carton flap or closure.

Figure 2:
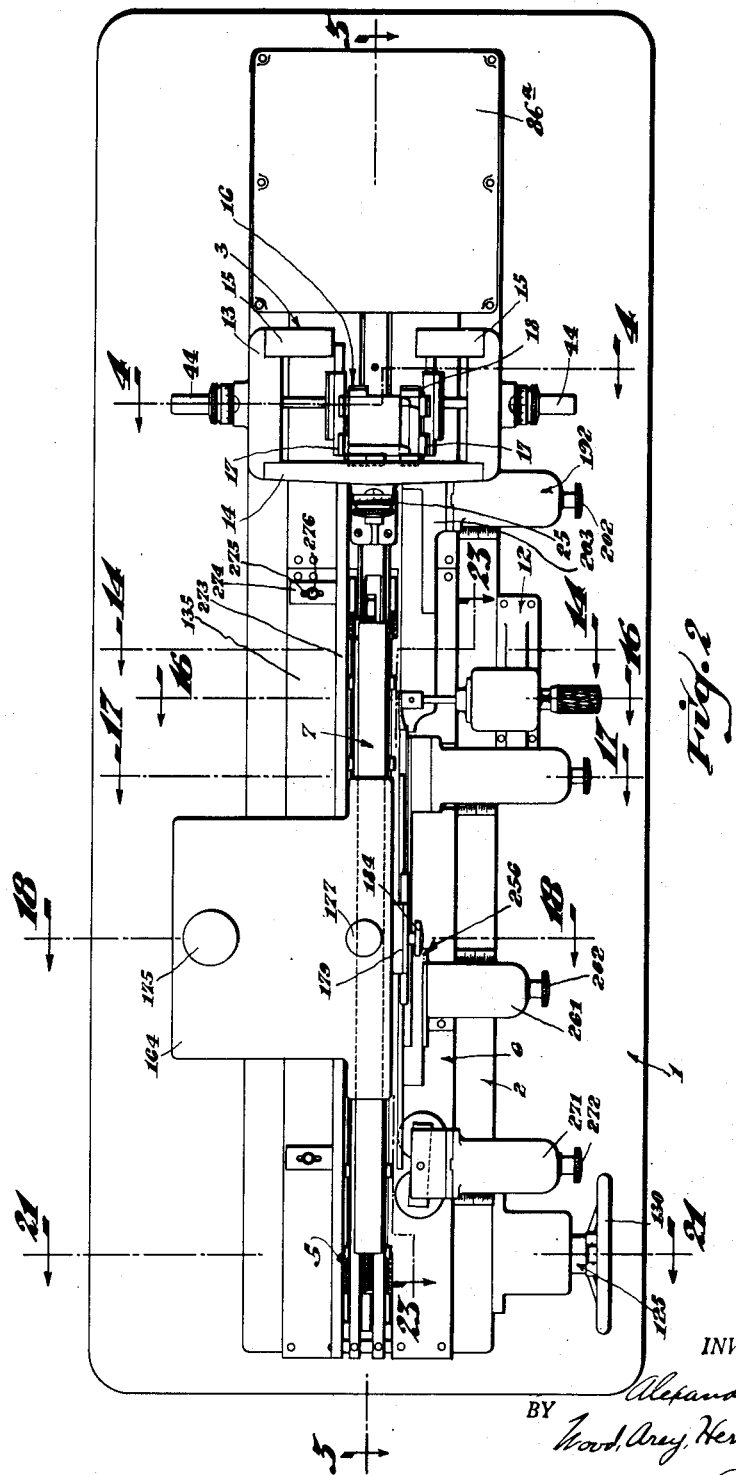
Figure 2 is a top plan view.

Figure 12 is a fragmentary plan view, similar to Figure 2, but enlarged to show the first flap forming elements.

Figure 13 is a sectional view taken on line 13—13 of Figure 11.

Figure 14:
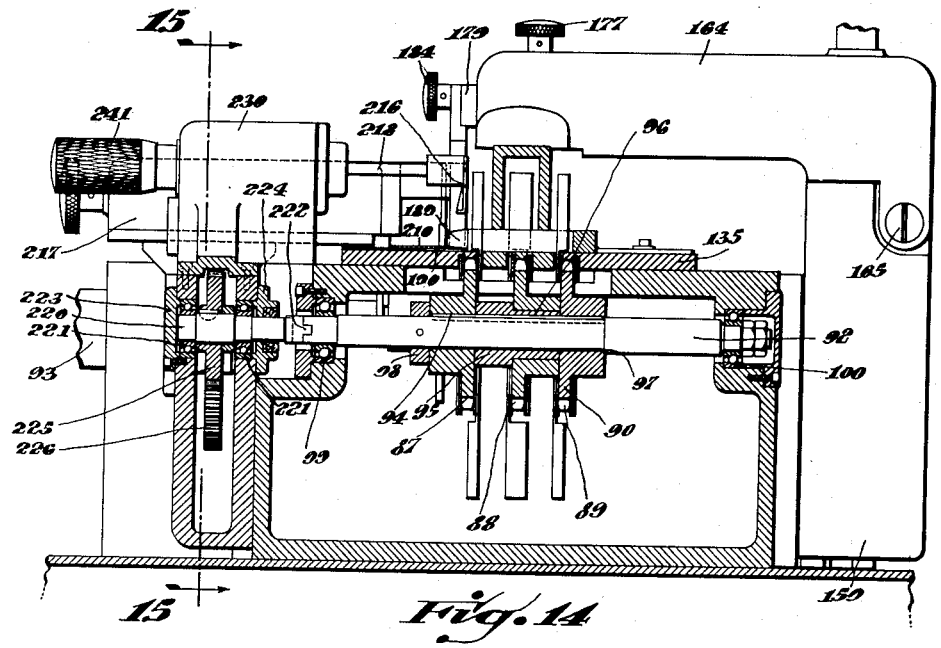

Figure 14 is a cross-sectional view taken on the line 14—14 of Figure 2.

Figure 15:
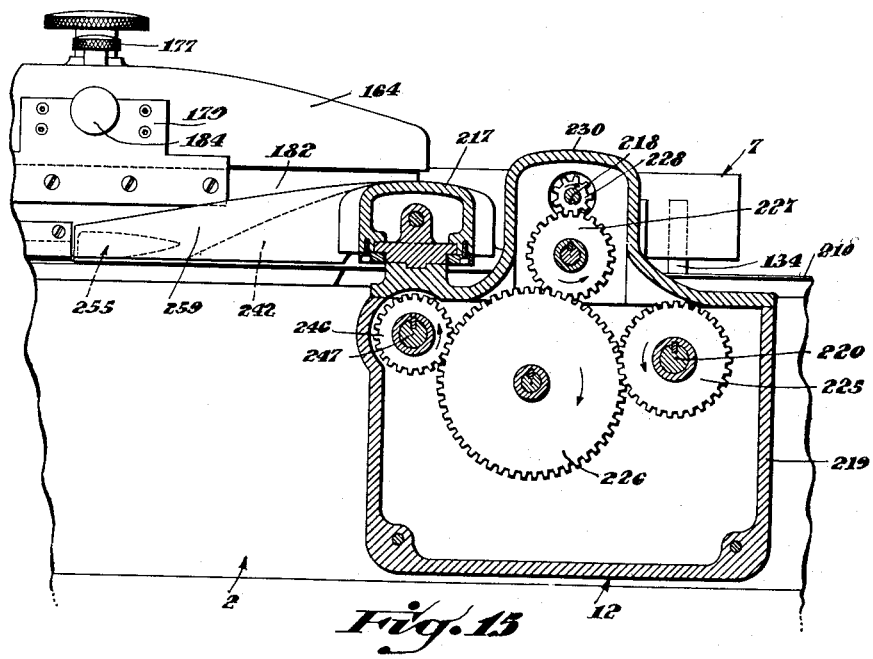

Figure 15 is a longitudinal sectional view taken on the line 15—15 of Figure 14.

Figure 16:
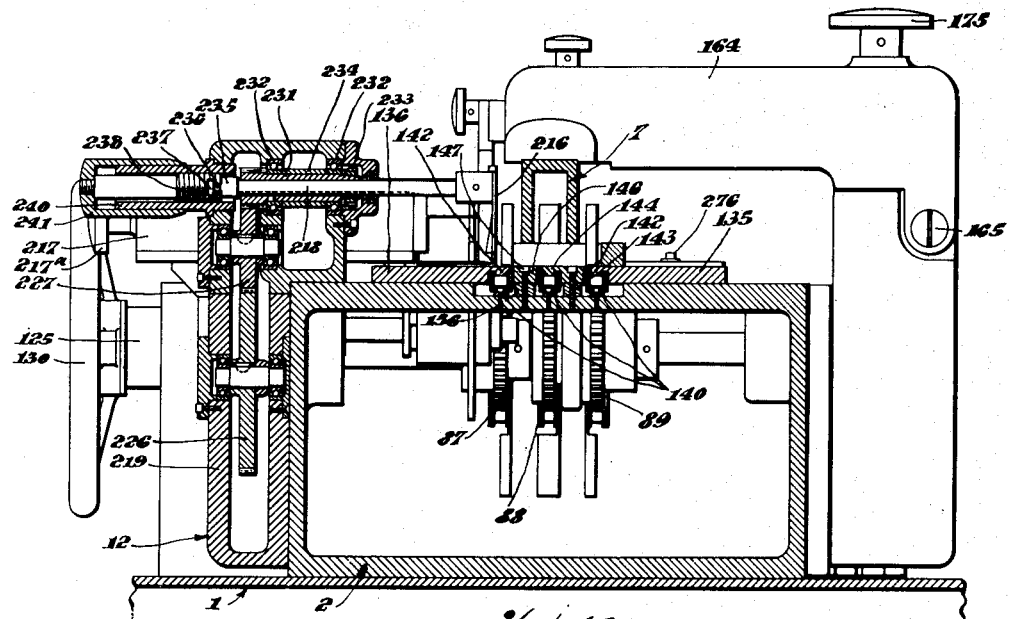

Figure 16 is a sectional view taken on the line 16—16 of Figure 2.

Figure 17:
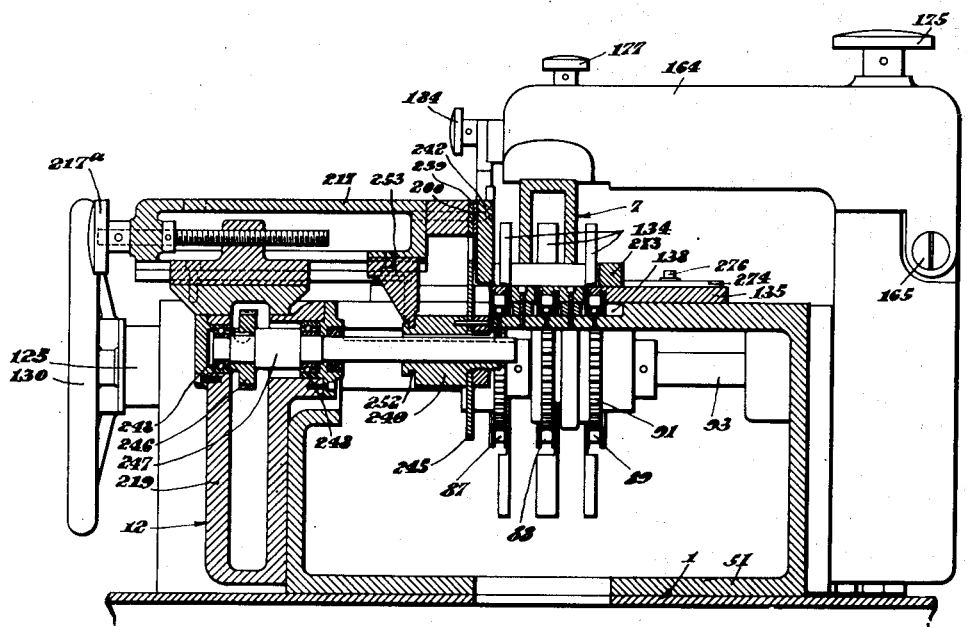

Figure 17 is a sectional view taken on the line 17—17 of Figure 2.

Figure 18:
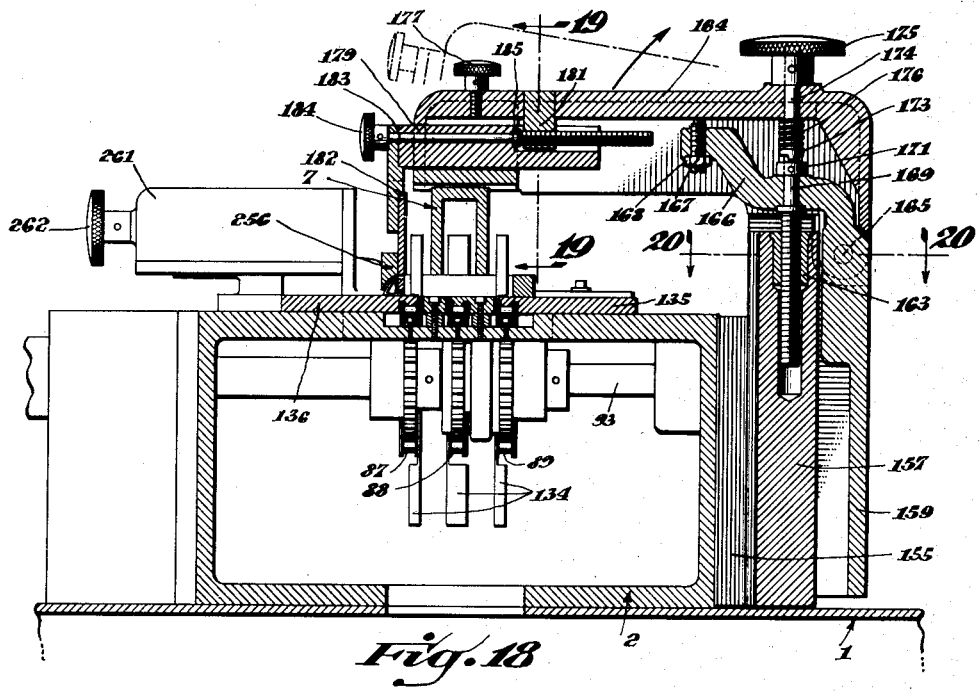

Figure 18 is a sectional view taken on the line 18—18 of Figure 2.

Figure 19:
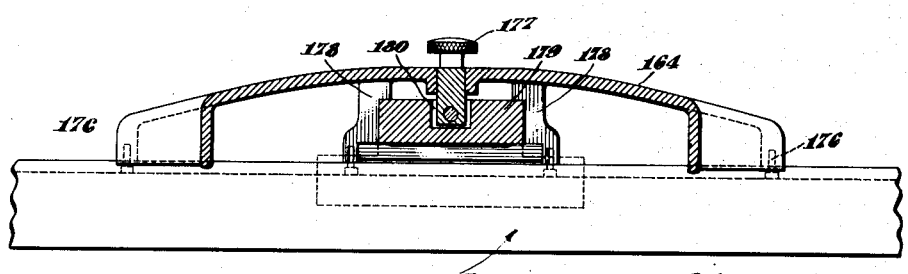

Figure 19 is a longitudinal sectional view taken on the line 19—19 of Figure 18.

Figure 20:
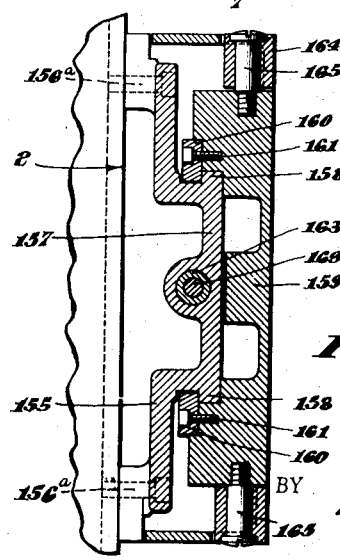

Figure 20 is a cross-sectional view taken on the line 20—20 of Figure 18.

Figure 21:
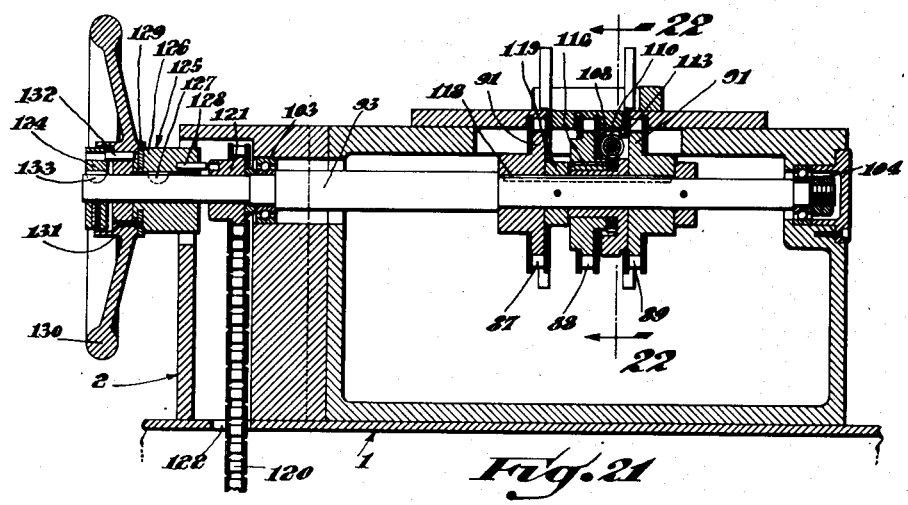

Figure 21 is a sectional view taken on the line 21—21 of Figure 2 showing the endwise portion of the transport and the drive therefor.

Figure 22:
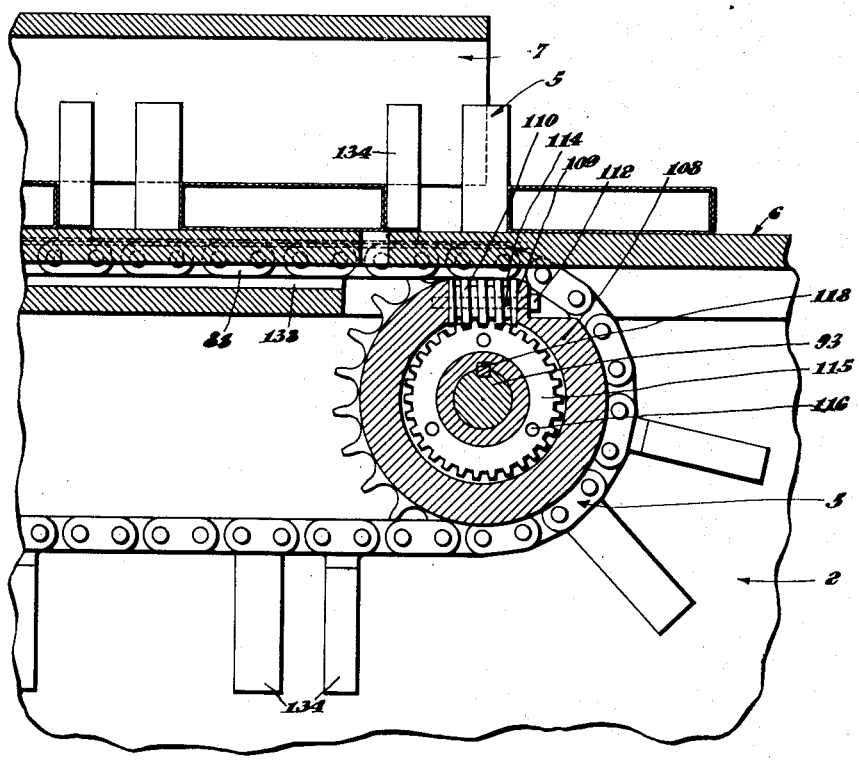

Figure 22 is a sectional view taken on the line 22—22 of Figure 21.

Figure 23 is a longitudinal sectional view taken on the line 23—23 of Figure 2 showing respective stations in the end closure apparatus.

Figures 24 to 28, inclusive, are fragmentary cross sectional views taken respectively on the lines 24—28 of Figure 23.

Figures 29 to 37, inclusive, are diagrammatic views showing various stages in the preparation of a package from the flat form, in which it is placed in the magazine, to the delivered form, with one of its ends closed with the package prepared for the reception of merchandise.

As indicated in Figures 29 to 37, the invention is disclosed in relation to a machine for opening the box and closing its one end only. For closing the other end of the box elements the same as those disclosed for the first end but arranged for the opposite end of the box may be employed following insertion of the contents within the box.

Figure 1:
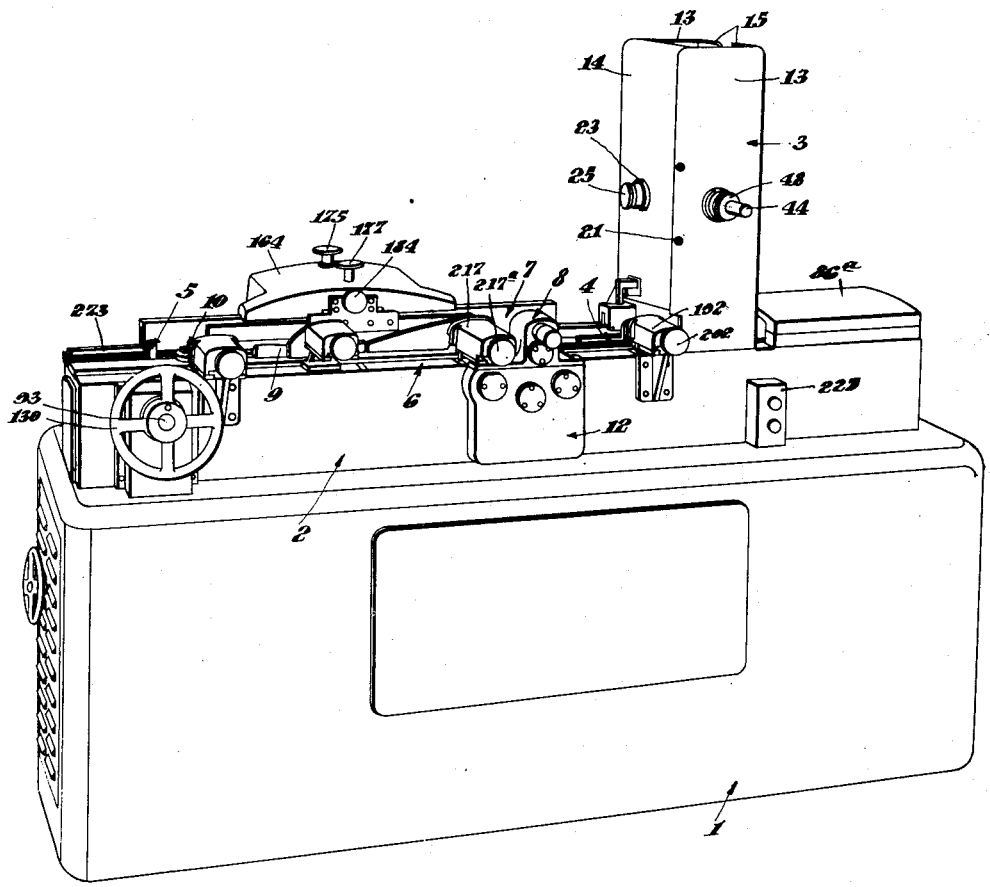
Figure 1 is a perspective view of the machine.

The main elements of the machine are shown in assembly on Figure 1. These include a table 1, which may be mounted upon rollers so as to be wheeled about conveniently at points adjacent loading machines or other places of operation, and a bed 2 which is fastened upon the table, to provide the primary support for the various machine elements. A magazine 3 extends upwardly from the bed adjacent one end thereof for receiving a stack of flat-folded cartons, and a feeder 4 is housed within the bed beneath the magazine. A transport 5 extends from the feeder in tandem relationship thereto, and the transport operates in conjunction with a table 6 provided in part by the top bed surface which is surmounted by a liftable presser bar or hold-down 7.

Figure 3:
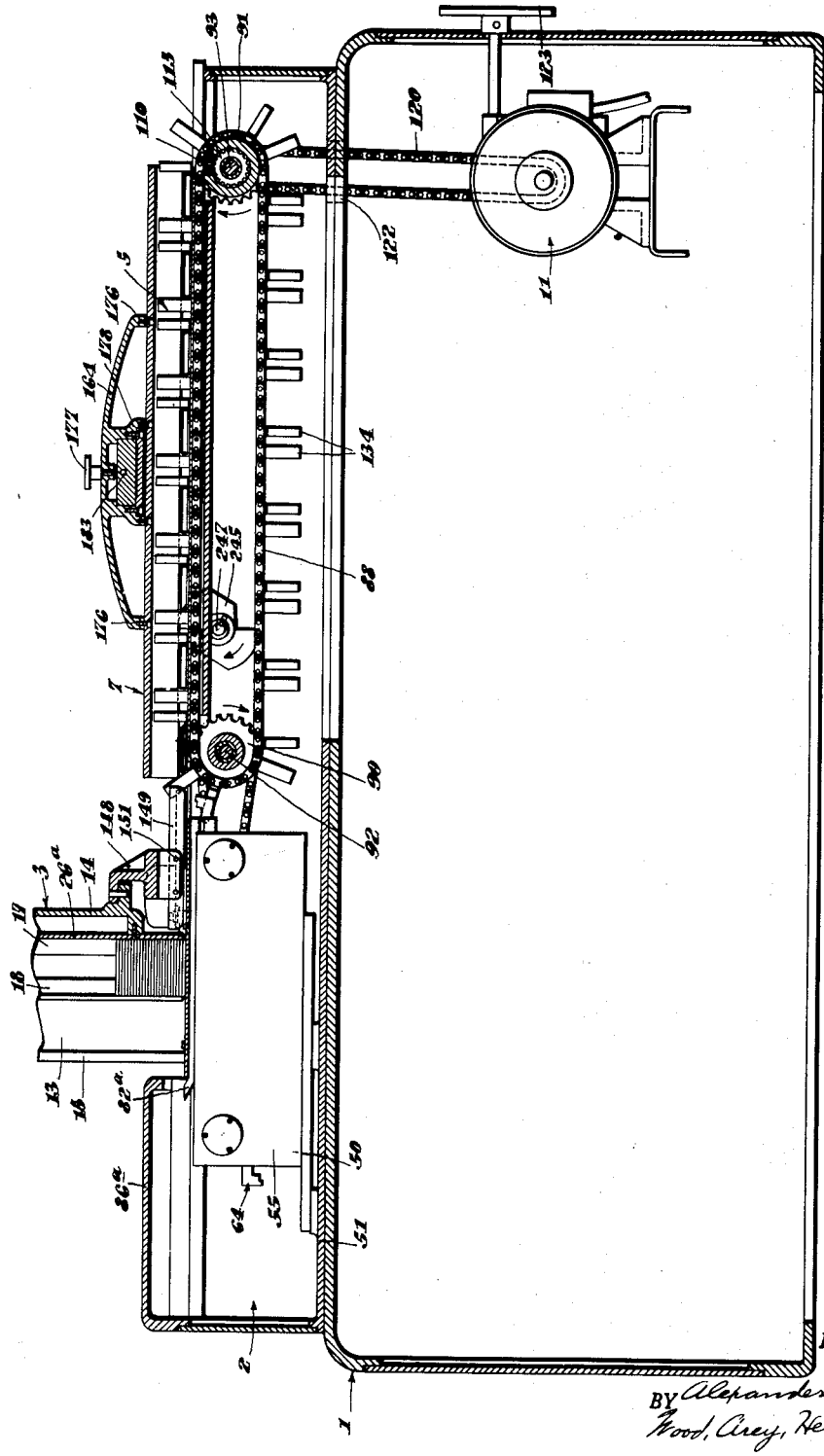
Figure 3 is a longitudinal sectional view taken on the line 3—3 of Figure 2.

Arranged along the side of the transport, adjacent one another serially, are end and side flap manipulating elements, including a side flap turner 8, a former and inserter assembly 9, and a pair of rollers 10 which bring the end flap into its fully tucked position. The apparatus is driven by a variable speed power unit 11 (Figure 3) mounted within the table, and the bed supports a gear box 12 at one side thereof for transferring drive from the transport to the movable flap former elements.

For convenience in the description, the various foregoing elements and assemblies are described in detail under the following respective headings:

Magazine

Figure 4:
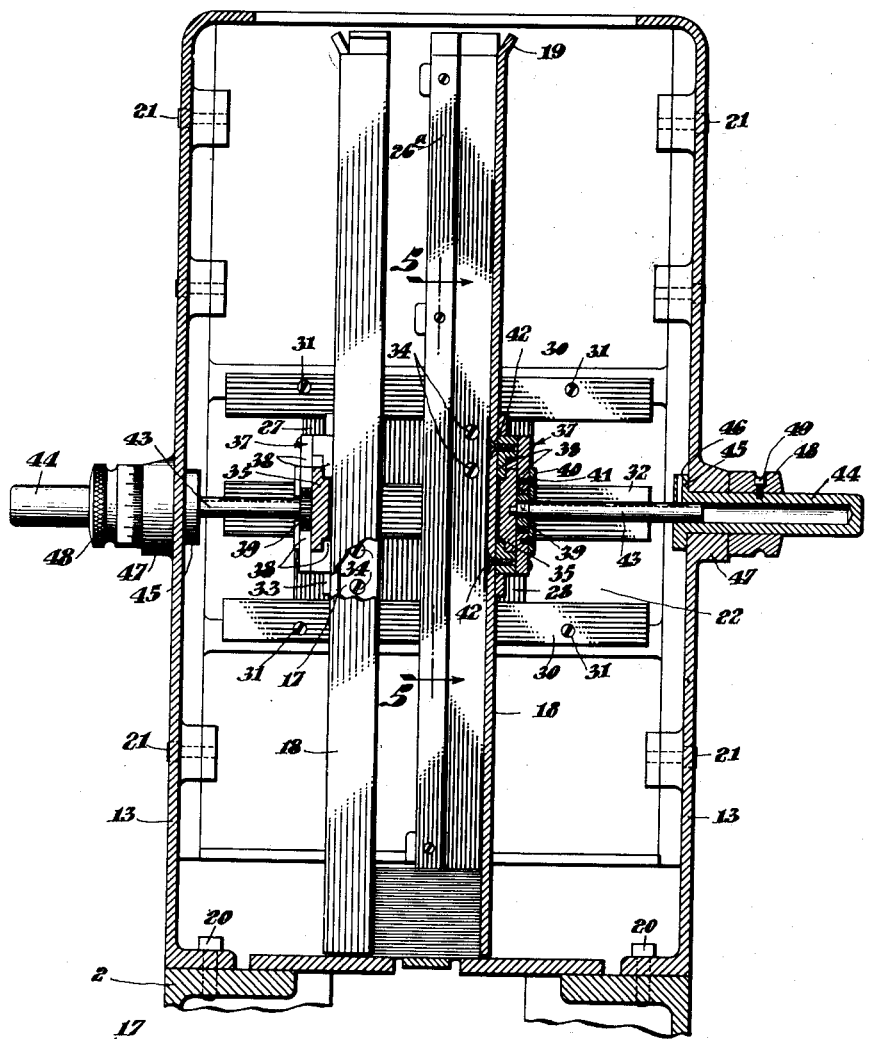
Figure 4 is a transverse sectional view taken on the line 4—4 of Figure 2.
Figure 5:
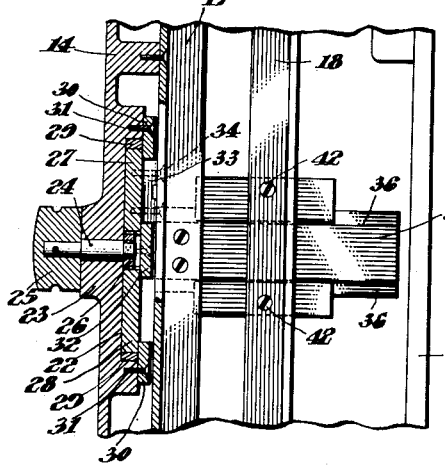
Figure 5 is a fragmentary sectional elevation taken on the line 5—5 of Figure 4.

The details of the construction of the magazine are shown best in Figures 2, 4 and 5. This unit comprises a housing made up of interconnected side walls 13—13, a cross wall 14, extending between the side walls, and two partial cross walls 15—15 which are mounted upon the side walls at the opposite upright edges thereof, and which have their inner edges spaced from one another so as to provide an access space to the hopper assembly 16 contained in the housing. The hopper consists of four vertical angle elements, two of which, 17—17, are arranged adjacent the cross wall 14, and the other two of which, 18—18, are spaced therefrom, toward the partial walls 15. The upper ends of the corner elements are splayed outwardly, as at 19 (Figure 4), to facilitate introduction of stacks of cartons.

Side walls 13 of the housing are bolted to the upper surface of the bed, as at 20 (Figure 4), and they may be in the form of castings having their opposite vertical edges recessed to receive the cross walls 14 and 15, which are held in place by means of bolts 21 threaded into suitable bosses.

The cross wall 14, approximately intermediate its top and bottom portions, has a cross slot 22 in its inner surface (Figure 5), and, at the outside of this wall, there is a boss 23 located substantially centrally of the slot. The boss is bored to form a bearing for a stud shaft 24 which has a knob 25 pinned thereto at the outside of the magazine. At the interior of the housing, shaft 24 rigidly carries a pinion 26, while upper and lower slide members 27 and 28 respectively are disposed within the cross slot 22, and each has rack teeth cut upon its inward edge respectively for mating engagement with the teeth at the top and bottom of the pinion 26. Gibs 29 extend along the outer edges of the slide blocks 27 and 28 in the guideway 22, and the slide blocks are held within the guideway by means of strips 30 which overhang their marginal edges, and which are held in place by screws 31. The inner marginal edges of the slide blocks, along the rack teeth thereof, also are sustained by means of a central strap 32 which is common to them and held by screws 31a.

One of the vertical hopper corners posts 17 of the pair is fastened to one of the slide blocks, i. e. 27, and the other to the opposite slide block, i. e. 28. For this support, each slide block carries a lug 33 at its exposed face, and the transverse face of the corner post is held in facial engagement therewith through screws 34. The construction, therefore, mounts the corner posts 17 rigidly in a vertical direction, but adjustably toward and away from one another in a direction transversely of the machine upon rotation of the knob 25. Intermediate the corner posts 17 is a rigid guide plate 26a, having its surface flush with the inner transverse faces of the corner elements to act as a supplemental alignment surface when the corner posts are spread far apart. This piece is held on cross wall 14.

The outer corner elements 18 are movable respectively toward the corner elements 17. To provide this result, guide arms 35, one for each corner element 18, are fastened rigidly to those respective faces of the corner elements 17 which extend in a direction longitudinally of the machine. The upper and lower edges of the guide arms are rabbeted, as at 36, and U-shaped assemblies 37 slidably embrace the upper and lower edges of the guide arms through spaced lips 38—38 respectively engaging the faces of the rabbets and the opposite faces of the guide arms. One of the flanges of each assembly, i. e., the upper one as shown in Figure 4, has rack teeth cut on its lower edge for engagement with a pinion 39, of which there is one for each assembly 37. The opposite flange in each assembly does not have rack teeth, but clears the pinion, so that rotation of the pinion in one direction moves the assembly 37 in one direction. These pinions are held in place by means of lip plates 40 bearing against their outer faces, the lip plates being fastened in position by screws 41. The corner posts 18 are held to the U-shaped assemblies 37 by screws 42.

The pinions 39 are pinned to stud shafts 43 extending outwardly therefrom in opposite directions toward and through the respective side walls 13 of the magazine housing, where the shafts are journalled within bushings 44 having collar portions 45 at the interior surfaces of the magazine side walls.

Shafts 43 have longitudinal keyways cut therein, and the collars 45 carry keys 46 engaging the keyways. At the outer surfaces of the side walls, where bushings 44 are rotatably journalled in bosses 47, the bushings carry graduated knobs 48 which are fastened thereto as at 49. The bushings are bored internally to permit the shafts 43 to move longitudinally therein. Thus, the knobs 48 drive the respective pinions 39 and the pinions drive the racks of the U-shaped assemblies 37 to which the corner posts 18 of the hopper are attached, causing the corner posts 18 to move toward or from corner posts 17, while the clearance bores in the bushings 44 permit the shafts 43 and assemblies 37 to be moved inwardly or outwardly as units toward and from one another upon rotation of knob 25. By manipulation of the three knobs, the cross sectional dimensions of the magazine conveniently may be adjusted to fit cartons of various sizes within the range accommodated by the machine.

Carton Feeder

Figure 8:
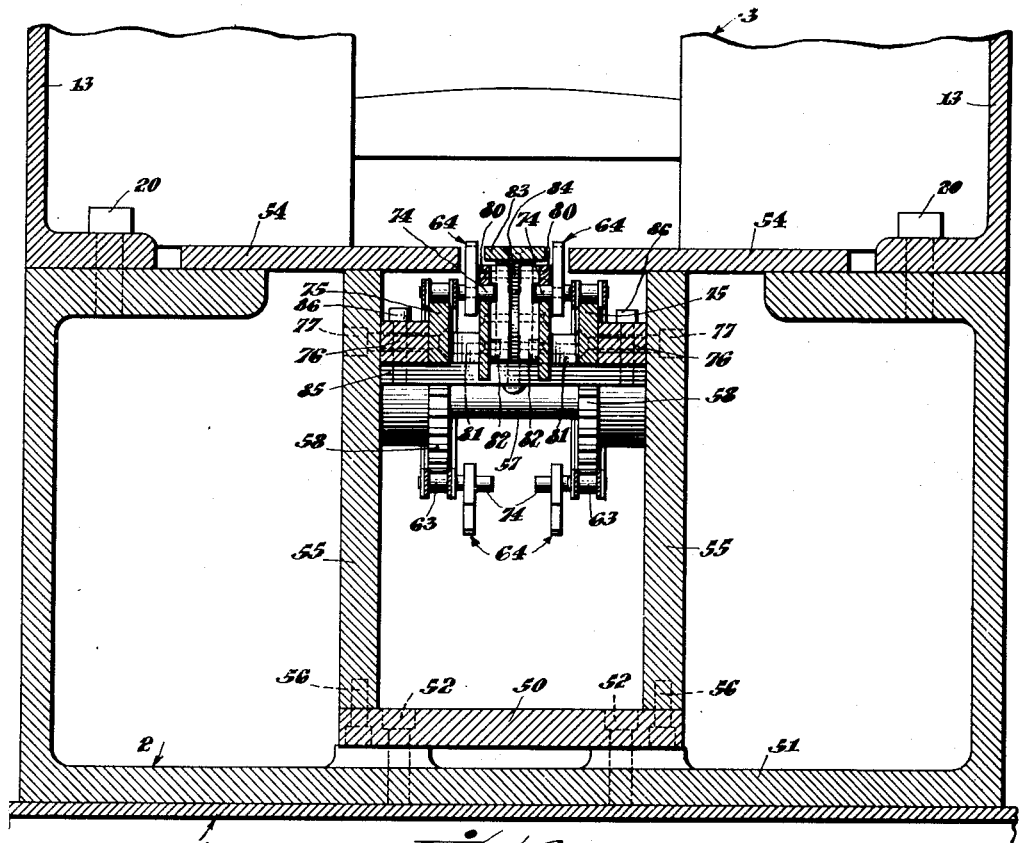
Figure 8 is a transverse sectional view taken on the line 8—8 of Figure 7 and shows the arrangement of the feed finger guide rails therefor.

The details of the carton feeding mechanism are shown in Figures 6, 7 and 8. This apparatus rests between the side walls of the bed and it is mounted upon a plate 50 (Figure 8) which is bolted to the bottom cross web 51 of the bed by means of screws 52. The upper surface of the bed includes longitudinal inturned flanges or ways 53, and each of these supports a horizontal table plate 54, the inner edges of which are spaced apart to provide a longitudinal passage for movable feeder elements. The inner edges of the table plates 54 which overhang the flanges are supported respectively by side plates 55—55 which rest upon the base plate 50 where they are fastened through screws 56.

Adjacent the upper portions of the side plates near the opposite ends thereof cross shafts 57 rotatably are journalled, preferably in antifriction bearings, as shown in Figure 6. The cross shafts 57 respectively carry pairs of sprockets 58 which are in longitudinal alignment with one another, and which are spaced inwardly from the side plates 55 by means of collars 59. The foremost of the cross shafts also has an extended portion 60 carrying a collar 61 and beyond the collar a sprocket 62, both fixed to the portion 60, through which the feed assembly is driven in timed relationship to the transport as described at a later point in the specification.

In the machine shown in the drawings, two chains 63—63 are employed, each having feed fingers 64 thereon for engaging the lowermost carton in the stack in the magazine. These fingers preferably operate in pairs, one on each chain, to maintain transverse alignment of the carton during its advance. However, additional fingers may be used where desirable, or as required by the characteristics of the carton the machine is intended to fabricate.

In the construction disclosed in the drawings, each feed finger 64 is an L-shaped element having an elongated portion 65 from which extends a laterally offset portion 70, presenting a pusher surface 71 at its outer extremity. Each feed finger is attached to the chain by the extension of two adjacent of the chain pins, e. g. 73-73 through the elongated finger portion 65 near the tail thereof, so as to carry the finger along the side of the chain and in longitudinal alignment with that link of the chain with which it is associated. The pins pass through the fingers and are riveted over to hold the fingers rigidly in connection with their respective link elements. In the alternative, the links and fingers may be integral. Each finger also has a guide pin 74 extending laterally therefrom at the side opposite the chain.

Adjacent the upper portions of the side plates 55, tracks 75—75 (Figure 8) are located directly underneath the chains so that the chain rollers travel over the upper surfaces thereof. These tracks are held in place by spacer blocks 76 which are fastened, through screws 77, to the side walls of the assembly. In addition to this support of the chain belts, the individual feed fingers are also guided by engagement of pins 74 in slots 78 through the delivery phase of movement of the fingers. The slots 78 are delineated by lower track members 79 and cooperative upper tracks 80 which are spaced apart a distance corresponding to the thickness or diameter of the guide pins 74. The lower tracks 79 are held by spacers 81 fastened to tracks 75 while the upper tracks 80 are sustained from the lower tracks through offset brackets 82 having notches therein to clear projecting portions of the feed pins 74. The upper tracks 80 are bent upwardly as at 82a (Figure 7) to facilitate entrance of guide pins 74 into the slots 78. Also, both tracks are adjustable in unison, to raise or lower the pushing portions 71 of fingers 64 relative to the level of table plates 54. This is accomplished by providing elongated slots 79a in the lower tracks which are traversed by the fastening screws 79b (Figure 7).

The table structure, comprising sidewise table plates 54, intermediate the feed fingers 74 is completed by a plate 83 which is fastened to a post 84 extending from a cross piece 85 which is mounted to the lower surface of the spacer members 76 by bolts 86.

A cover plate 86a extends across the bed rearwardly of the magazine 3 to enclose the moving parts of the feeder.

Transport

The transport mechanism 5 comprises a plurality of continuous chains or belts extending longitudinally of the bed 2 of the machine beneath the table 6 thereof. In the structure shown in the drawings, three of these chains, 87, 88 and 89 (Figure 6), are employed. They are strung respectively upon rear sprockets 90 and head sprockets 91. The rear sprockets are mounted upon a tail shaft 92, while the forward sprockets are mounted upon a head shaft 93 (Figure 17). Both shafts are journalled at their endwise portions in antifriction bearings carried in the side walls of the bed 2 of the machine.

In the preferred structure, the apparatus provides means for moving all of the chains in unison during normal machine operation, and also for moving one or more of the chains independently of the others; thus, in the machine disclosed, center chain 88 is shiftable independently of outer belts 87 and 89. In more particular detail, the outside sprockets 90 at the tail shaft 92 (Figure 14) have hubs thereon keyed directly to the tail shaft by means of an elongated key 94. A bushing 95 surrounds the tail shaft intermediate the outer sprockets 90, and it is also keyed thereto. This bushing however has a counterturned portion 96 which rotatably receives the hub of the sprocket carrying the center chain 88. Tail shaft 92 provides a shoulder 97 for holding the outside sprocket at one side of the assembly against longitudinal movement, and a collar 98 is pinned to the shaft against the other outside sprocket to hold them all in assembly. Bearings for the extremities of the tail shaft 92 are indicated at 99 and 100, and the shaft is threaded to carry a pair of lock nuts 101 disposed against the bearing 100 at its one end, while the shaft has a drive slot 102 at its other end which projects beyond the bearing 99.

The sprocket assembly at the discharge end of the transport is shown in Figures 21 and 22. Here, head shaft 93 has its ends journalled in bearings 103 and 104. The shaft projects beyond the bearing 104 where it carries lock nuts 105, and at the opposite end the shaft has a projecting portion upon which the clutch and hand wheel assembly 107 are mounted. The outside head sprockets 91—91 are keyed to the head shaft, as described in conjunction with the tail shaft assembly. However, intermediate the outer sprockets is a bushing presenting an annular overhanging flange 108 having a transverse slot 109 in its periphery for the reception of a worm 110. The periphery of the bushing also contains a notch 111 adjacent the slot 110 which forms a recess for the head 112 of a shaft 113 which extends across the slot 109 to form the support for the worm 110. The worm lies in the plane of the flange 108 and is pinned to the shaft 113, as at 114, while the head 112 of the shaft has a socket therein for the reception of an Allen wrench through which the worm may be rotated.

The transverse slot 109 extends through the flange 108 for exposing the thread of the worm to the teeth of a worm wheel 115 which is fastened rigidly to a face of the center sprocket member of the head end assembly; for instance, the worm wheel may be keyed to the center sprocket by one or more radially spaced pins 116. The bushing presenting the annular overhanging flange 108 includes an elongated sleeve portion 108a of reduced diameter which surrounds the head shaft 93 to rotatably support the center sprocket assembly, and the bushing also is keyed to the head shaft by the same key, 118, which extends through the outer sprockets 91. A spacing collar 119 is interposed between the end of the sleeve portion of the bushing and the adjacent outer sprocket. By virtue of this construction, a wrench may be inserted into the socket head of the shaft 113 to rotate the worm 110, thereby driving the worm wheel 115 and causing the center sprocket of the assembly to be rotated independently of the two outside sprockets. In this manner the spacing of the center chain fingers may be varied with respect to the cooperating fingers on outer chains to enable the transport to operate upon boxes of different widths. An access hole 119a (Figure 22) is located in the table 6 of the machine through which the wrench may be inserted into the worm shaft socket when the latter is brought around to a position beneath the access hole by manual movement of the transport.

The head end shaft is driven from the power drive 11 through a chain belt 120 which extends upwardly around a drive pinion 121, which is carried on the projected portion of the head shaft. The drive unit, as previously described, may be mounted within the table of the apparatus, with the belt 120 passing through a suitable clearance opening 122 in the top surface thereof along the side of the bed.

Preferably the drive unit is of the variable speed type and includes a hand wheel 123 which is accessible beyond an end wall of the table. The variable speed drive unit enables the rate of production of the machine to be coordinated with the requirements of the packaging machine, or to be varied in accordance with the type or size of the carton being erected.

A hand wheel and clutch assembly 107 (Figure 21) enables the machine to be operated slowly by hand to facilitate adjustment of the apparatus. In the present embodiment, a construction is employed which permits either the hand wheel or the power drive, but not both, to be coupled to the head shaft 93, whereby the drag of the power drive is eliminated if the hand wheel is being utilized, and whereby the hand wheel is idle or stationary if the power drive is being utilized. For power drive purposes, a chain driven sprocket 121 is mounted for rotation upon shaft 93. The shaft, at its extremity, carries a drive collar 124, and a selective clutch element 125 is interposed between the drive collar 124 and the sprocket 121. The clutch element comprises a sleeve 126 having a longitudinal keyway therein which is engageable by a key 127 on the shaft, whereby the sleeve is always rotatably coupled with, but is longitudinally movable of, the shaft. At the end of the sleeve, adjacent the sprocket 121, a pin or tooth 128, is arranged for engagement with a mating recess or tooth in the end of the sprocket 121. At the opposite end the sleeve 126 has a reduced neck which is engaged by mating split rings 129 to which a face of the hand wheel 130 is fastened through screws 131. Split rings 129 thus attach the wheel 130 to the sleeve 126. This permits the hand wheel to be rotated independently of the sleeve 126. The hand wheel in turn has a pin or tooth 132 positioned for reception in a mating opening or against a mating tooth on the drive collar 124. The spacing of the parts is such that the hand wheel assembly may be connected with the drive collar 124 or alternatively with the sprocket 121. When the hand wheel is pulled toward collar 124, the manual drive is from the hand wheel through pin 132 to the collar, thence directly to the shaft through drive collar key 133. At this time, sprocket 121 and all of the power drive apparatus is idle. When the hand wheel is pushed inwardly, pin 128 forms a direct connection with the sprocket 121 and motion therefore is transmitted from the power apparatus through the sprocket 121 to the pin 128, thence through the sleeve 126, through the key 127 and head shaft 93. At this time, the hand wheel is idle.

The belts 87, 88 and 89 of the transport apparatus preferably are of the same type as those employed in the feed mechanism, comprising roller elements linked together and shafts 92 and 93, in elevation, are so positioned that the upper course of the belts is just beneath the surface of table 6.

Each belt has a plurality of fingers 134 extending laterally therefrom for engaging a carton resting on the table. At their upper extremities, above the table, the fingers are somewhat enlarged so as to provide substantial facial areas, while the portions of the fingers adjacent the points of connection at the belt are of reduced thickness to enable narrow finger passageways to be employed in the table, and thereby render almost the full table area to be available for effective support of cartons during their erection and conveyance. Each finger 134 comprises a relatively thin but elongated base (Figure 22), an upright portion extending transversely therefrom, and a shoulder at the transition from the thin to the thick part of the finger which forms a square base. The thin portion of the finger is bored to receive projecting portions of adjacent link pins of the chain, which are riveted over to hold the fingers rigidly with respect to the chain links with which the fingers are connected.

The fingers of the transport are arranged in groups, the members of which respectively engage opposite transverse edges of a carton so as to act upon those edges and effect erection of the carton as well as to sustain the carton during its conveyance. In the apparatus shown in the drawings, the forward or leading edge of the carton is engaged by a single finger extending from the center chain, while fingers on the two outer belts, in alignment of one another crosswise of the machine, operate upon the trailing edge of the carton. The three-finger arrangement just described has been found to be desirable and effective for operation upon most of the cartons of conventional shapes because the three-point contact on the carton minimizes the need for exact alignment and also enables pressure to be exerted on the carton, near its endwise portions, where the need for squareness is important in connection with assembling and insertion of the end flaps. However, additional chains and other finger groupings may be utilized, for instance, in the design of machines for handling cartons of an elongated nature or cartons made of relatively weak materials.

The table 6, in respect to which the fingers operate, comprises edgewise strips 135 and 136 (Figures 16, 17 and 18), which are mounted upon the upper surface of the machine bed where they are bolted in place. The upper surface of the bed 2, between the tailshaft 92 and the headshaft 93, extends all the way between the side walls. This upper surface has a longitudinal groove 138 (Figure 17) therein, and plates 135 and 136 overhang opposite edgewise portions of this groove. The bottom surface of the groove 138 forms a support for lower chain tracks 140 (Figure 16) which are positioned beneath the rollers of the three chains. These tracks are in the form of rectangular bars narrow enough to fit between the side links of the chains and the bars held in place by means of screws 141.

The rollers of the two outer chains 87 and 89 are held down upon the two outer tracks 140 by track portions 142 which are appropriately delineated by grooves cut in the underneath surfaces of the table members 135 and 136. The grooves provide clearance for the links of the belts and the inner edges of the table plates just clear the fingers 134 carried by the respective outer belts.

At one side of the center chain 88 a spacer block 143 is mounted to support, at its upper surface, a strip-like table element 144 which overhangs the center belt where its lower surface has a groove similar to that at the table plates 135, 136, to provide a track for holding the rollers of the center chain upon the center track 140. At the other side of center chain 88 a spacer block 156 is employed which, at its upper surface, carries a strip-like table element 146. Strips 144 and 146 are held in place through screws 147 and all of the table elements have their edges spaced longitudinally to provide grooves or passageways for the reduced thickness portions of the transport fingers; likewise, all of their upper surfaces are substantially flush with one another and with the side table members 135 and 136.

Table 6 starts at a point adjacent or just forward of the tail shaft 92 and extends beyond the transport at the discharge end of the machine. As shown in Figure 7, the table comprising elements 54—54 and 83 of the feeder extends forwardly therefrom toward the transport where it is notched out to provide clearance spaces for the transport fingers 134 as they move through a curved path at the tail sprockets.

The spacing of the feed fingers is such that at the forward end of their stroke they occupy positions in-between the fingers of the transport. Moreover, the longitudinal extension of the feed fingers, from the points at which they are connected to the feed chains, enables them to be guided in groove 78 to a point forwardly of the forward sprocket 58 of the feed mechanism into the range of operation of the transport.

Figures 29, 30, 31:
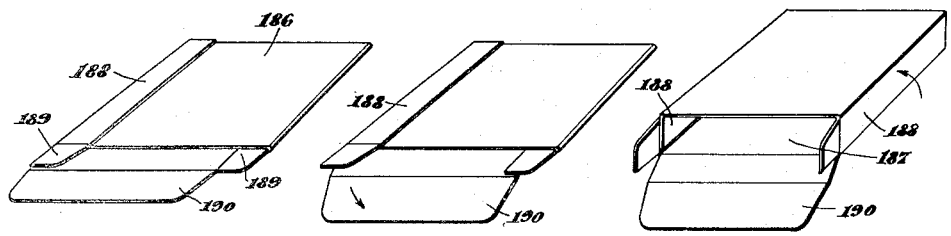

The preferred construction by which the carton is erected or squared in the transport is illustrated in Figures 7, 9 and 10 and, diagrammatically, in Figures 29 to 31. For convenience, the lead finger of each group which engages the forward edge of the carton is marked A, and the trailing fingers of the groups are marked B (see Figure 7).

Figure 7 shows the relationship to the parts when a feed finger 64 has driven a carton, X, forwardly to the end of its delivery stroke where it is about to be picked up by the transport. The apparatus is timed so that the carton reaches this position just as the trailing fingers B are coming into the table plane. Erection of the carton is effected through a decrease in the distance between the fingers A and B at the table plane, as they move relatively into their linear path from the curved path along which they were moving around the tail sprockets. Thus, as the trailing fingers B just enter the table level, the total available distance between fingers A and B is designated by the dimension L. At this time, the trailing fingers B are at an obtuse angle with respect to the table, while the leading finger A of the group may be perpendicular or substantially so. Further movement of the transport causes the obtuse angle to be decreased and the distance L at table level to be shortened to a new dimension L', which is indicated in Figure 9. L' is a distance which is less than the width of the carton in its flat position, but greater than the width of the carton in its fully erected position. Thus, the trailing fingers B have caused the leading edge of the carton to abut the leading finger A and are exerting a squeezing action on the carton in a direction transversely thereof. This squeezing movement causes a hinging action to take place at the carton edges, and the upper face of the carton is displaced from the lower face whereby the carton is partially squared. This movement continues until the trailing finger has reached the end of its curved path, and has moved into its linear path, that is, until the dimension between the trailing and leading fingers has been still further reduced to the dimension L'' (Figure 10) which corresponds in width to the width of the fully squared box. In this condition, the box is supported and conveyed by the transport past the flap operating elements.

On the outer chains, the feed fingers B are longitudinally spaced apart from one another distances somewhat greater than the width of the largest size cartons which the machine is intended to accommodate, and fingers A, on the center chain, are spaced apart from one another corresponding distances; however, the effective spacing L'' between the leading and trailing fingers A and B of a cooperative group may readily be varied to suit cartons of given sizes through the adjustment provided by the worm and worm wheel assembly at the head shaft 93. The feeder is driven in unison with the transport through a sprocket 98a (Figure 6) fixed upon the transport tail shaft 92, and through a chain 98b which extends from sprocket 98a to sprocket 62 on the forward shaft 57 of the feeder mechanism.

*Hold down for cartons*

At the magazine housing the cross wall 14 contains a boss near its lower edge which supports a bracket 148 (Figure 3) having two depending legs (Figure 11) extending longitudinally of the machine. Each of these legs is slotted longitudinally to receive an elongated holddown bar 149. These are urged toward the feeder table by compression springs 150 which are mounted in bores in the arms of the bracket. The bars 149 are traversed by pins 151 which pass through vertical slots in bars 149 to allow the bars to have some vertical movement. These bars hold the cartons flat against the feeder table as they are delivered one at a time from the hopper.

The main presser bar 7 extends longitudinally of the machine from a point adjacent the forward end of the hold-down bars 149 to the discharge end of the machine where it extends over the forward transport sprockets and serves as a guard. The element 7 is in the form of a channel, its side walls being spaced apart from one another to engage endwise portions of the carton while the space between the walls of the channel affords a clearance passage for the projecting fingers A on the center chain.

In order to accommodate cartons of different overall thickness, or height above the table, the hold down 7 is adjustable vertically; for this purpose it is mounted upon an arm overhanging the machine which may be swung upwardly to throw the bar out of the way and provide convenient access to the transport and to various other portions of the machine.

In the construction disclosed, a bracket 155 (Figures 18 and 20) is mounted upon a side wall of the machine to which it is bolted through screws 156a. The bracket has a central offset portion 157 presenting opposed flanges 156 which are straddled by a slide block 159. Keeper strips 160, fastened by screws 161, are located at the inner face of the slide block to engage the inner faces of flanges 158 of the bracket which at a central portion thereof has a vertical boss 162 bored to receive a threaded bushing 163. The top of the slide block 159 is straddled by an arm 164 which is pivoted to the sides thereof through shouldered pivot screws 165. Slide block 159 also has a rigid knee 166 extending therefrom over the top of the bracket 155 and underneath the arm 164. The knee, at its inward end, carries an adjustment screw 167 and lock nut 188, one end of the screw bearing against the underneath surface of arm 164 to limit downward swinging movement thereof. Knee 166, in alignment with the bushing 163 which it overhangs, also is bored to receive a screw shaft 169 which carries an abutment flange 170 in engagement with the lower surface of arm 166. Shaft 169 extends downwardly beyond the flange where it is threaded into the bushing 163, and upwardly above arm 166 where it carries a pinned collar 171 which has a cross slot at its upper surface. This slot is engageable by a drive dog 173 projecting from the lower end of a shaft 174 journalled in the overhanging arm 164 of the assembly. A knurled knob 175 is pinned to the shaft 174 at the outside of the overhanging arm, and a spring 176 biases the drive dog on the shaft toward a collar 171. The structure forms a breakable connection between the screw 169 and the overhanging arm 164 which permits the arm to be lifted. When the arm is lowered into place, the drive dog 173 bears upon the upper surface of the collar 171 and may be engaged with the drive slot therein by rotation of the knob 175, after which further rotation of the knob will cause the screw 169 to be rotated to raise or lower the overhanging arm 164 and thereby adjust the position of the hold-down bar 7 with respect to the transport table. The hold-down bar is fastened to arm 164 by means of screws 176 (Figure 18) and, to facilitate raising, the arm carries a lift knob 177.

In conjunction with the presser element 7, the overhanging arm also carries a pair of depending bosses 178 (Figure 19) which are spaced apart from one another to define a guideway and bottom for a slide block 179 which is slotted, as at 180, to clear a nut 181 extending from the underneath surface of arm 164. The slide block extends beyond the forward edge of arm 164 where it supports a depending wall plate 182 having a plow member thereon which is described later in connection with the flap manipulating apparatus. For adjustment of the slide block, it is threaded longitudinally to receive a shaft 183 carrying a knurled nut 184 at its outer extremity, and a collar or flange 185 at its inner end forwardly of the nut 186. Beyond the flange, shaft 183 is threaded into the nut whereby rotation of the knob 184 causes the slide block to move inwardly or outwardly in a direction crosswise of the machine for adjusting the position of the plow toward or from the transport to accommodate cartons of different lengths.

End closure apparatus

The various operations performed upon the carton frame from the flat form, in which it is delivered from the magazine, to the fully erected form, in which the carton is delivered from the machine ready for the reception of merchandise, are shown diagrammatically in Figures 29 to 37 of the drawings.

The carton here shown is one of rectangular shape having top and bottom faces 186 and 187 respectively, opposite side walls 188, side flaps 189 formed as extensions of the side walls, and an end closure flap 190. To facilitate erection of the carton it may be scored or creased at the various lines where bends or corners are to occur, as is conventional. In the flat form in which the carton is placed within the magazine, the faces 186 and 187 lie against one another, and the side walls 188 and 189 respectively lie adjacent the faces 187 and 186, while the end flap projects freely from the end of the carton. In this disclosure the erection of the carton and closure of one end only are described, inasmuch as duplicate operations may be performed upon flaps at the other end after the carton has been erected and the merchandise has been placed within it.

The flat cartons are placed within the hopper, end flap down, that is, face 187, from which the end flap 190 extends, is at the bottom of the carton, underneath the face 186. In fabrication this closure is folded upwardly and support of the carton, which is necessary during these operations, is provided in a simple way from the table across which the carton is transported. Heretofore, with the flap overhanging the carton prior to end closure, various superstructure elements were necessary to sustain the end flap until the side flaps had been closed, and additional supports were required to carry, over the table, the apparatus for preparation and insertion of the end flap. As a result machines operating upon that principle have necessarily comprised relatively complicated table superstructures which required dismantling, then reassembly each time the machine was to be modified for operation on a carton of another size. In the present apparatus all of the carton flap closure means are arranged at substantially the table level; they are supported from the bed; no superstructure other than the liftable presser foot 7 is required and the parts are clearly visible and accessible to assist the operator in making final adjustments. For this reason the present machines may be changed over from one carton size to another within less than a quarter of an hour, or so, whereas the machines which have been available in the past always have required several hours of work to set up and sometimes more.

Figures 32, 33, 34:
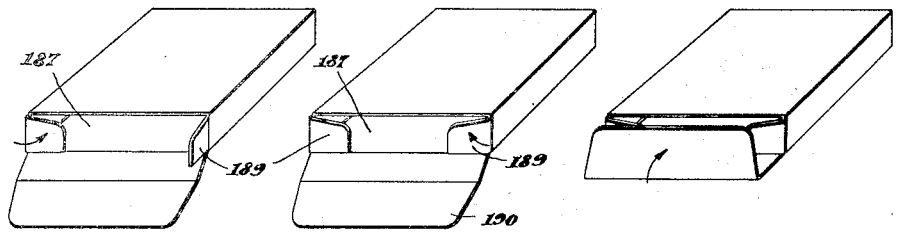
Figures 35, 36, 37:
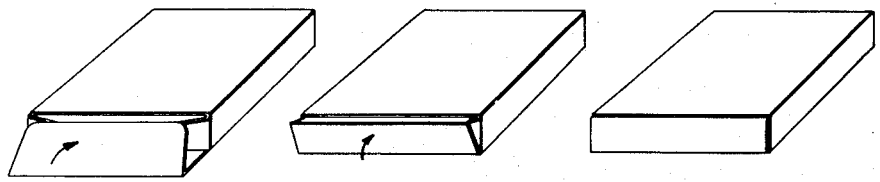

In the preferred embodiment of the invention the end flap is guided beneath a plate so as to be held against lifting movement, while the side flaps pass over the plate until they are closed, after which the end flap is released and closed over the side flaps. For this purpose, the end flap is bent slightly downward, whereby it is bent downwardly to isolate it from the side flaps and thereafter to introduce it within the guideway. Next the leading side flap is swung to a closed position over the end of the erected carton (Figure 32), then the trailing side flap is closed (Figure 33). The marginal edgewise portion of the end flap is bent transversely as in Figure 34, if necessary, to form a tuck-in portion thereon and the end flap is then turned toward the box (Figure 35) whereupon the tuck-in portion is introduced into the carton (Figure 36). The final closure is shown in Figure 37.

Depression of the end flap 190 is provided by a finger 191 (Figures 11, 12 and 13) which is carried from an adjustable assembly indicated generally at 192, mounted on the bed of the machine adjacent the delivery end of the feeder. In more detail, this assembly includes an angle bracket 193 having a portion resting on the upper surface of the machine bed and another portion engaging a side wall of the bed to which it is bolted by screws 194. The upper surface of the bracket presents opposed flanges 195 and a nut 196 extending upwardly intermediate the flanges. A hollow slide block 197 has inwardly extending flanges 198 engaging the upper surface of the bracket while the lower portion of the slide block is grooved to straddle the extremities of the flanges 195. Slide plates 199 are fastened to the bottom of the slide block to engage the lower surfaces of the flanges 195 and thus slidably retain it on the bracket. The nut 196 threadedly receives a screw 200 having a collar portion 201 engaging the inner face of the slide block end wall while the screw shaft extends through the end wall to carry an adjustment knob 202 whereby rotation of the knob moves the slide block toward or from the transport.

Slide block 197, at its inner end adjacent the transport, carries a horizontal arm 203 extending longitudinally of the machine and overhanging the table. The end of this arm, adjacent the feeder, extends transversely of the machine and is slotted as at 204 to receive a clamp screw 205 which is in threaded engagement with a block 206, having the finger 191 depending therefrom. The finger is angulated as shown in Figure 13, to engage the leading edge of the end flap and gradually cause this leading edge to be depressed during its movement. A scale 207 is fastened to the slide block, whereby the operside of the slide block 197 while an index mark for the scale is inscribed on a plate 208 which is fastened to the slide block, whereby the operator is enabled to adjust the slide block for cartons of this size.

Arm 203 has an elongated portion 209 extending therefrom toward the front of the machine which is employed as a support for a horizontal guide plate 210 which starts at a point just beyond the back end of the finger 191. The lower surface of this guide is spaced above the table of the machine as shown in Figures 14 and 16 whereby a passageway for the end flap 190 delineated to hold it in an out of the way position while operations are conducted on the side flap. To lead the end flap into this passage the receiving edge of table plate 136 is chamfered as at 211 (Figure 13). The inner longitudinal edge of plate 210 is chamfered to dull blade like thickness and is positioned adjacent the end of the carton for the side flaps to ride over its upper surface while the end flap moves underneath. The front end of the plate has an entrance curvature, as indicated by the dotted line at 210a (Figure 12), which assists the carton flaps in arranging themselves in these positions. By virtue of this construction the inner longitudinal edge of the plate 210 serves as a device for aligning all of the ends of the cartons in the transport with one another, whereby all of the cartons are caused to be in uniform positions with respect to the flap manipulating devices.

The leading and trailing side flaps 189 of the carton are folded inwardly over the end of the erected carton respectively by means of an abutment 215 (Figure 23), and a rotatable finger 216. Abutment 215 is a stationary member located at the inner end of a transversely adjustable slide block 217 which is similar in construction to the adjustable depresser finger assembly 192 of Figures 11 and 13, as shown in Figure 17. This apparatus is adjusted through a control thimble 217a. The abutment lies in the path of the forward extended side flap of the carton and holds the flap against advance as the carton moves, thereby causing the flap to bend inwardly to pass the abutment.

Rotatable finger member 216 which catches the trailing side flap and bends it inwardly while the end flap is held beneath plate 210 is in the form of radially notched plate mounted upon the end of a shaft 218 which is driven through a gear mechanism as shown in Figures 14 and 15. This mechanism previously indicated generally at 12 is housed in a box 219 fastened to the side wall of the bed. Tail shaft 92 of the transport assembly extends through the side wall of the bed where its end contains slot 102. The gear box, in axial alignment with tail shaft, carries a stud shaft 220 which is rotatably journalled in bearings 221 and which presents a tang 222 for reception in the cross slot 102 of the tail shaft. The outer gear box bearing 221 is covered by a cap 223 and at the inner face there is a cap and packing gland 224 which fits within a recess provided in the side wall of the machine bed.

Stud shaft 220 has a gear 225 keyed thereto which meshes with an idler gear 226. This idler drives a second idler 227 which is in meshing engagement with a pinion 228 keyed to the finger shaft 218. Both idler gears 226 and 227 are mounted upon cross shafts and the support for these is similar to that of the stud shaft 220. Pinion 228 and the second idler 227 are at a level above the machine table, and the gear box therefore has a dome or cap 230 configurated to house these members. It is also to be noted (see Figure 17) that the slide block 217 which adjustably supports abutment 215 is carried by the gear box cap in order to permit the finger 216 to be arranged closely adjacent the abutment 215. This compactness of the parts enables the machine to manipulate the flaps on boxes of small width.

In order to provide for adjustment of shaft 218 transversely of the machine, pinion 228 is formed at the end of an elongated bushing 231 (Figure 16), which is journalled in bearings 232 carried in the dome 230 of the gear box. The pinion resides in facial engagement with one of the bearings and the bushing carries a take-up nut 233 residing against the other of the bearings, while the bearings themselves are spaced apart by a collar 234 surrounding the bushing. Shaft 218 slidably extends through the pinion bushing where it has a head 235 which is necked as at 236 to provide an endwise annular flange 237. This flange is rotatably received in a cross T slot 238 of a rotatable screw member 239 which threadedly operates within a thimble 240 extending from the outer face of the gear box dome. Screw 239 carries a knurled sleeve 241 which extends around the thimble 240.

The keyway in shaft 218 is elongated; therefore the shaft is axially adjustable through the thimble bushing at the same time annular flange 237 of the shaft is rotatable in the T slot 238 of the screw 239. Thus, when the knurled sleeve 241 is rotated it rotates the screw 239 and thereby pushes the shaft 218 or moves it outwardly to adjust the position of the finger 216.

It is to be noted that the leading edge of the forming element 216 is bent laterally from the plane of rotation to urge the flap gradually toward closed position. This finger, of course, is driven in timed relationship to transport movement through the gearing just described which is so arranged that the finger swings past each box in the transport at a linear velocity which is greater than the linear movement of the transport, whereby the desired relative motion between the finger and the side flap is provided.

The end plate on the slide block 217, which at its one end provides abutment 215, is elongated in the opposite direction as at 242 (Figures 15 and 23) to provide a surface adjacent the end of the carton for bearing against the inturned side flaps to keep them from opening. As a continuation of this surface in a direction forwardly of the machine, plate 182 (Figures 18 and 23) is utilized, which is supported from the overhanging arm 164 of the apparatus as previously described. Figure 23 shows the construction in which the plate 242 is inclined downwardly in a direction forwardly of the machine where it terminates in a narrow guide portion 243 while the plate 182 is cut substantially to match this contour.

By the time both side flaps have been closed the carton being operated upon has moved beyond the end flap guide plate 210 and the end flap next is squared to prepare it for insertion in the carton. The apparatus for this purpose generally is similar to the rotatable side flap finger 216, that is, a rotatable forming member 245 swings up against the bottom surface of the end flap and folds its marginal endwise portion through 90° against the outside surface of plate 242, while the inside surface of this plate is holding the side flaps closed.

To drive the end flap forming member 245 the gear box 219 contains a pinion 246 which is in meshing engagement with the first idler gear 226. The pinion is pinned upon a shaft 247 intermediate bearings 248 (Figure 17) which are mounted in the side walls of the gear box. The shaft 247 extends inwardly where it slidably carries a collar 249 which is slidably keyed thereto. End flap closure member 245 is mounted on counterturned portion of the collar where it is held by a nut 250 and by a lock pin 251. For adjustment of the former transversely of the machine, to suit cartons of different lengths, the outer end of collar 249 has an annular groove 252 which is engaged by an arcuate shifter member 253 depending from the inner underneath portion of the slide block 217. The slide block 217 thus has the double function of adjusting the longitudinal wall 242 and of adjusting the position of the end flap former which operates in conjunction therewith.

The flap former has two notches therein providing diametrically opposed flap engaging surfaces, the leading edges of which are pitched angularly from the plane of configuration to assist the former in marginally swinging the endwise portion of the end flap of the carton upwardly against the outside face of guide 242. Through the gearing this unit also is timed in relation to transport movement so that the leading edges alternately engage successive boxes conveyed by the transport.

The distance between the end of the carton and the surface against which the marginal portion of the end flap is bent up, that is, the outer surface of guide 242, corresponds substantially to the thickness of the carton. In the construction illustrated plate 242 is made sufficiently thick to conform to this dimension whereby its outer surface and lower edge act as a die for the end flap while the inner surface holds the side flaps. To accommodate thicker cartons without the use of a different plate the slide block 217 may be moved outwardly. This will allow the side flaps to open partially but still be retained in a position for ready closure, as they move past the guide plate 182 which can be adjusted to a position directly adjacent the end of the box. In such an instance the receiving edge of the guide plate 182 is chamfered to prevent the trailing side flap from catching upon it. On the other hand, separate plates appropriately spaced apart may be substituted for the plate 242, the inner to hold the side flaps and the outer to serve as a die for the end flap.

From this point on the forming of the flaps and insertion thereof is conducted by a series of plows indicated generally at 255, 256 and 257.

It is the function of the first of the plows to turn the bent-up endwise portion of the end flap of the carton toward the body of the box. This plow, therefore, consists of a wedge-shaped element 258 which is mounted upon a plate 259 supported from the slide block 217. The plate 259 is parallel to but spaced outwardly from the plate 182 by means of a spacer 260, as shown in Figures 15 and 23. The plate 259 extends forwardly beyond the plate 242 so that the plow element 258 clears plate 242 and resides in the path of movement of the bent-up portion of the end flap. As shown in Figure 23 the plow is at the outside of the guide plate 182.

The second plow 256 comprises a wedge surface for lifting that portion of the end flap which is between its bent-up portion and the box proper so as to raise it above the table and turn the tuck toward the box. This is shown in Figure 25. The second plow is carried on a slide block 261 which is of similar construction to the other slide blocks of the apparatus and is adjustable through a knob 262 to position plow 256 in accordance with the preceding elements.

The third plow 257 comprises a strip member overhanging the bent-up and lifted flap and which includes a concave arcuate surface 263 (Figures 25 and 18) for directing this flap toward a slot 264 which is located in plate 182 at a level just below the level of the upper surface of the box. Slot 264, as shown in Figure 23, starts at a point just forwardly of the first plow 255 and extends all the way to the end of the guide bar. It is to be noted that that portion 264a of the guide bar which is beneath the slot is chamfered inwardly so as to permit the end flap to be turned into the box. This slot, in other words, holds the tuck part of the end flap against lifting as it is directed toward the box and as it is inserted therein.

As the carton is conveyed beyond the last plow and beyond a notch 265 (Figure 23) in the plate 182 the end of the carton with all of the parts partially closed is exposed to a pair of rollers 266 and 267 which rotate about vertical axes and progressively push the end flap to its final position. These rollers are rotatively carried on a strap 268 which, at a point intermediate the rollers, is fastened by a screw 269 to an angle bracket 270 extending from the end of a slide block 271 having an adjustment knob 272 therefor through which the rollers can be moved transversely of the machine. This assembly is similar in details to the other slide blocks of the apparatus. When the cartons move past this pair of rollers, the first one of which preferably is spaced outwardly from the other so that they exert a progressive action on the end flap, the carton closure is completed.

The transport grips the cartons and holds them effectively against transverse displacement during erection and conveyance and while the end flaps are being operated upon. However, an alignment bar 273 (Figures 2 and 24) extending longitudinally of the machine along the transport may be employed to provide additional alignment and additional support against displacement. This bar rests upon the surface of the table plate 135 and is held in place through brackets 274 (Figures 2 and 12) having slots 275 therein which are traversed by screws 276 threaded into the table plate. The slots permit the bar to be moved toward or from the transport apparatus.

While the electrical connections to the motor drive are not shown, the motor may be controlled through a start and stop switch 277 which is located on the table 1 adjacent the magazine.

By virtue of the unidirectional linear motion of the cartons and the freedom from reciprocating parts, the machine is capable of running at a high production rate. All of the forming operations are gradual and progressive and therefore the danger of jamming the machine through improper positioning of the carton is minimized. The end flaps are fashioned by mechanical guides and the forming operations therefore are conducted independently of any tendency the paper material may have to assume a contrary position. The apparatus may, if desirable, be equipped with the usual safety and reloading switches capable of functioning to disconnect the machine in the event of jamming or in the event the hopper becomes empty.

Having described my invention, I claim:

1. Means for erecting a carton from a flat folded condition, comprising a plurality of continuous belts, means for driving the belts at a constant speed, means for guiding the belts from a curved path to a linear path, first and second sets of fingers carried by separate ones of said belts in fixed relation thereto and adapted respectively for engaging the opposite longitudinal edges of a carton disposed between said fingers, the fingers of one set being longitudinally spaced apart from those of the other a distance corresponding to the width of the carton when it is fully erected and less than the width of the carton in its flat folded condition, means for introducing a flat folded carton between the fingers as they move from the curved path into the linear path, whereby the distance between the fingers gradually decreases as they move into the linear path and they cooperatively squeeze the carton therebetween to unfold it to an erected condition, and means for relatively shifting said separate ones of said belts to adapt the longitudinal spacing between said fingers to accommodate cartons of various sizes.

2. In a cartoning machine, a planar base; means mounting a series of pairs of equally spaced finger elements at said base; means for continuously moving said elements from below the plane of said base through a curvilinear path, wherein said pairs of elements diverge with respect to each other, to a rectilinear path parallel to and above the plane of said base, wherein said elements are parallel to each other, so that said elements sequentially pass through said base while rounding said curvilinear path and erect to extend vertically from said base while travelling said rectilinear path; means for adjusting the distance between the fingers of each pair; a magazine mounted above said planar base and including means operable to guide a stack of flattened cartons resting upon said base; means in said magazine for adjusting said guiding means for accommodating stacks of cartons of varying dimension longitudinally of said base; and a feeder operable to sequentially and singly remove the bottommost flattened cartons from the stack in said magazine and move them along said planar base to deliver them singly between pairs of said fingers before the trailing finger of a pair passes above the plane of said base, whereby the cartons are erected by said elements in shifting to their parallel positions.

3. In the machine described in claim 2, fixed hold down means independent of said finger elements, spaced from said base and operable to retain the cartons between said pairs of fingers while being erected and after both fingers of each pair have rounded said curvilinear path; and means for adjusting the distance between said hold down means and said base to accommodate cartons of varying erected height.

4. A cartoning machine comprising an elongated planar, substantially horizontal table having a longitudinally extending vertical slot therethrough; an open bottomed magazine disposed above said table and over a portion of said slot to guide a stack of flattened cartons with the bottommost carton resting upon the table; a feeder having a finger projecting upwardly through said slot and engageable with the bottommost carton in said magazine; means for driving said feeder through a working stroke to move the bottommost carton from the magazine; a first sprocket beneath said table and adjacent the end of the working stroke of said feeder; a second sprocket spaced from said first sprocket; an endless element travelling around said sprockets and having a longitudinally spaced pair of fingers rigidly affixed thereto and protruding through said slot during the upper run of said element, said first sprocket being so disposed beneath said table that said fingers follow a curvilinear path in a vertical plane when emerging from beneath said table; means for driving said element at a fixed speed for synchronism with the working strokes of said feeder so that said feeder delivers a flattened carton between said fingers after the leading finger has emerged above the table but before the second finger has emerged, whereby the carton will be squeezed between said fingers and erected as the second finger moves to a vertical position; a longitudinally extending hold down bar overlying the table to hold the carton against the table during erection and subsequent operations, flap closing means arranged along said table to close the end flaps on a carton as it moves along said table under the influence of said hold down bar and said fingers, adjustable guide means in said magazine to accommodate cartons of various sizes, means to vary the longitudinal spacing between said fingers on said endless element; means to adjustably position the hold down bar vertically with respect to the table; and means to adjust said flap closing means laterally with respect to said hold down bar.

ALEXANDER H. ROSS.

REFERENCES CITED

The following references are of record in the file of this patent:

UNITED STATES PATENTS

| Number | Name | Date |
|---|---|---|
| 757,667 | Mayall | Apr. 19, 1904 |
| 1,041,007 | Bracy | Oct. 15, 1912 |
| 1,060,027 | Robertson et al. | Apr. 29, 1913 |
| 1,337,845 | McGeouch et al. | Apr. 20, 1920 |
| 1,494,977 | Rose | May 20, 1924 |
| 1,495,191 | Macnaughtan | May 27, 1924 |
| 1,563,323 | Bergstein | Dec. 1, 1925 |
| 1,688,459 | Forward | Oct. 23, 1928 |
| 1,778,804 | Lindner | Oct. 21, 1930 |
| 1,857,680 | Van Der Pyl et al. | May 10, 1932 |
| 1,873,059 | Smith et al. | Aug. 23, 1932 |
| 1,987,803 | Ryan | Jan. 15, 1935 |
| 2,059,254 | Lasker | Nov. 3, 1936 |
| 2,174,728 | Potdevin | Oct. 3, 1939 |
| 2,314,434 | Toelke et al. | Mar. 23, 1943 |
| 2,349,204 | Staude | May 16, 1944 |
| 2,429,536 | Von Sydow | Oct. 21, 1947 |
| 2,441,445 | Ringler et al. | May 11, 1948 |
| 2,448,198 | Tennent | Aug. 31, 1948 |